United States Patent
Behrmann et al.

[19]

[11] Patent Number: 5,865,362
[45] Date of Patent: Feb. 2, 1999

[54] METHOD OF FRICTION WELDING A SUPPORT TO A BOXED VEHICLE STRUCTURAL ASSEMBLY

[75] Inventors: Richard J. Behrmann, Colgate; John F. Hinrichs, Menomonee Falls; Robert J. Heideman, Kewaskum; Phillip C. Ruehl, Elm Grove; Jianzhong Xie, Wauwatosa, all of Wis.

[73] Assignee: R. J. Tower Corporation, Grand Rapids, Mich.

[21] Appl. No.: 790,913

[22] Filed: Jan. 29, 1997

[51] Int. Cl.⁶ ..................................................... B23K 20/12
[52] U.S. Cl. ...................... 228/114.5; 228/182; 29/897.2
[58] Field of Search ................................. 228/114.5, 182; 29/897.2

[56] References Cited

U.S. PATENT DOCUMENTS

| | | | |
|---|---|---|---|
| 1,593,783 | 7/1926 | Stresau | 29/897.2 |
| 2,173,525 | 9/1939 | Wallace | 280/106 |
| 2,784,983 | 3/1957 | Dean | 29/897.2 |
| 4,659,005 | 4/1987 | Spindler | 228/114.5 |
| 5,322,208 | 6/1994 | Hinrichs | 29/897.2 |
| 5,460,317 | 10/1995 | Thomas et al. | 228/112.1 |
| 5,469,617 | 11/1995 | Thomas et al. | 29/889.21 |

*Primary Examiner*—Patrick Ryan
*Assistant Examiner*—Jeffrey T. Knapp
*Attorney, Agent, or Firm*—Craig J. Lervick; James Earl Lowe, Jr.

[57] ABSTRACT

A method of welding together a motor vehicle structural assembly is available. The vehicle structural assembly includes a boxed member including an outboard wall, a top wall, a bottom wall and an inboard wall spaced from the outboard wall. The inboard wall has an opening therein. The motor vehicle structural assembly also includes a cylindrical support including a first end and a shoulder spaced from the first end at least the distance the boxed member inboard wall is spaced from the boxed member outboard wall. The method comprises spinning the support and advancing the support through the inboard wall opening so that the support first end is friction welded to the outboard wall and so that the support shoulder is friction welded to the inboard wall.

19 Claims, 5 Drawing Sheets

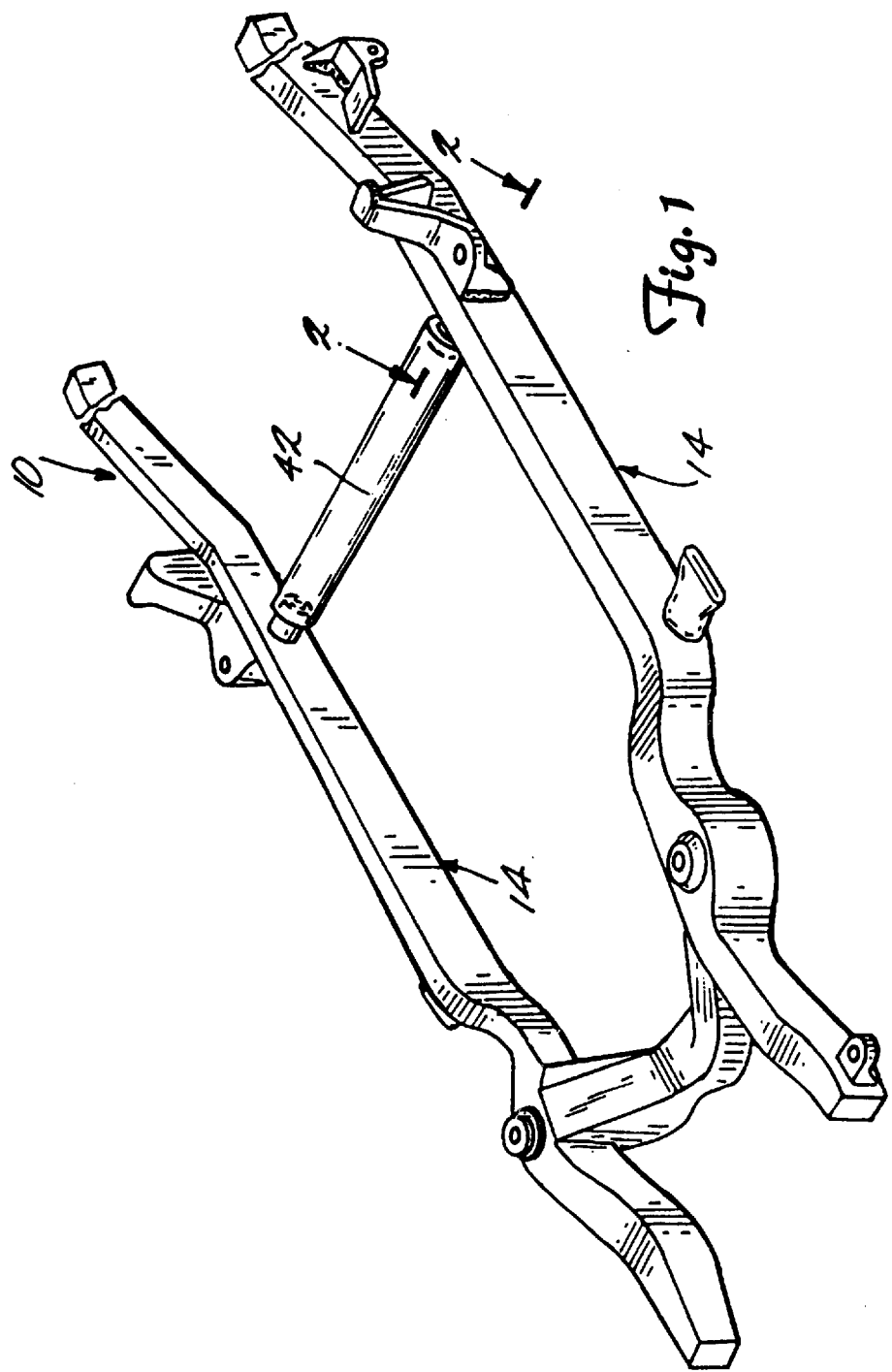

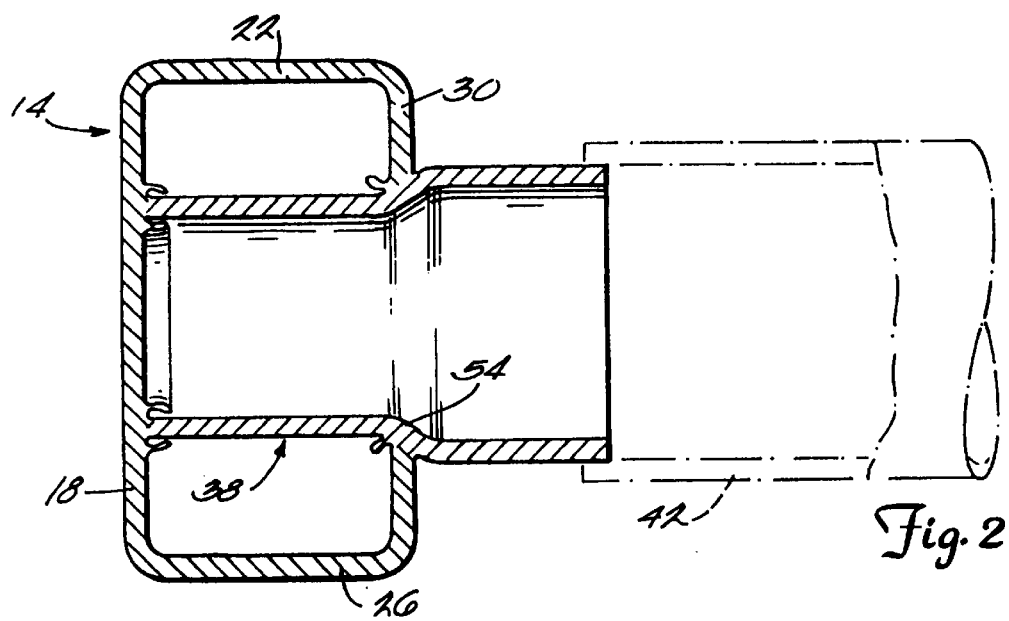
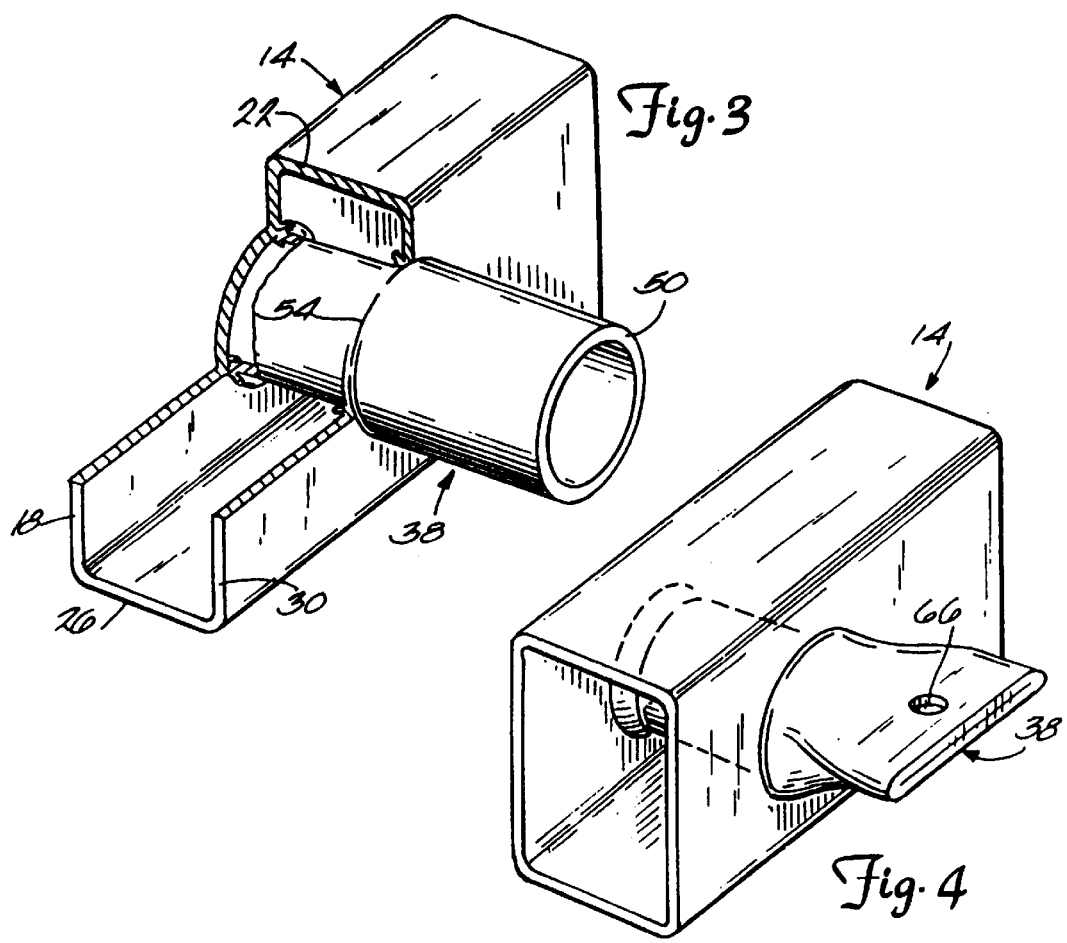

METHOD OF FRICTION WELDING A SUPPORT TO A BOXED VEHICLE STRUCTURAL ASSEMBLY

BACKGROUND OF THE INVENTION

The invention relates to vehicle frames and, more particularly, to truck frames and methods of constructing such frames, including supports.

A conventional truck frame includes a pair of generally parallel side rails with a plurality of cross member assemblies extending there between. The side rails are C shaped and open inwardly toward the other side rail or are boxed in cross section.

Various devices need to be attached to the side rails. Such devices include the cross member assemblies and brackets for supporting springs, the engine, body mounts. etc. In prior art constructions, such as Wallace U.S. Pat. No. 2,173,525, supports have been attached to boxed side rails in the following manner. A box member includes an outboard wall, a top wall, a bottom wall, and an inboard wall spaced from the outboard wall. A box member can be a tube or an assembly of two channels. Openings are cut in the inboard wall and in the outboard wall, such that a support can be passed through both openings. After being passed through both openings, the support is welded first to one wall and then to the other wall. Such a method of constructing a support attached to a side rail has had various advantages. The method of construction, however, had disadvantages, for it was difficult to align the inboard wall opening and the outboard wall opening, and to ensure a good weld fit-up of the support to the respective walls. A weld of the support to the wall after the support is placed in the wall opening may result in a weld which only partially extends through the thickness of the wall and only partially into the support, as illustrated in FIG. 9 of the drawings. A larger problem is that to allow for misalignment, at least one hole must be oversized, and the resulting gaps welded up—a poor weld condition. As shown in FIG. 12, it is known to solve this problem with a full collar spacer between the support and the wall. This requires two 360 degree welds and positioning of the extra part.

SUMMARY OF THE INVENTION

The invention provides a method of welding together a motor vehicle structural assembly. The vehicle structural assembly includes a boxed member including an outboard wall, a top wall, a bottom wall and an inboard wall spaced from the outboard wall. The inboard wall has an opening therein. The motor vehicle structural assembly also includes a cylindrical support including a first end and a shoulder spaced from the first end at least the distance the boxed member inboard wall is spaced from the boxed member outboard wall. The method comprises spinning the support and advancing the support through the inboard wall opening so that the support first end is friction welded to the outboard wall and so that the support shoulder is friction welded to the inboard wall.

In one embodiment of the invention, the support first end engages the outboard wall and then the support shoulder engages the inboard wall.

In one embodiment of the invention, the outboard wall has an opening therein opposite the inboard opening, and the support passes through the outboard wall opening and the support first end also has an end shoulder which engages and is friction welded to the outboard wall.

In one embodiment of the invention, the boxed member is one side rail of the vehicle structural assembly and the opposite side rail also includes a cylindrical support attached to the side rail in a similar manner.

In one embodiment, a cross member extends between the first and second side rails and is attached to each of the supports friction welded to each side rail.

In one embodiment, the support is a hollow cylinder and in another embodiment is a solid cylinder.

In one embodiment, the cross member is friction welded directly to the side rails by simultaneously pressing both side rails over the spinning cross member.

In one embodiment, the support is a straight cylinder (not stepped) which is expanded to fit in the inboard wall hole and friction welded to the outboard wall.

One of the principal features of this invention is the provision of a new method of attaching supports to vehicle structural assembly side rails, the method resulting in a better connection of the support to the side rail with less difficulty in manufacture. The method provided herein results in a better weld of the support to the structural assemblies and also allows for greater variation and tolerances in the opposing holes in the walls of the boxed side rail. The method allows easy assembly of a support to a boxed member without loss of fit-up at final contact.

Other features and advantages of the invention will become apparent to those skilled in the art upon review of the following detailed description, claims and drawings.

BRIEF DESCRIPTION OF THE DRAWINGS

FIG. 1 is a partial perspective view of a truck frame embodying the invention.

FIG. 2 is a cross sectional view taken along line 2—2 in FIG. 1 of a cross member attached to a support which is attached to the side rail of the truck frame of FIG. 1 using the method of the invention.

FIG. 3 is a partially broken away perspective view of the support attached to the side rail, as illustrated in FIG. 2.

FIG. 4 is a perspective view of another embodiment of the support attached to the side rail.

Figure 5:
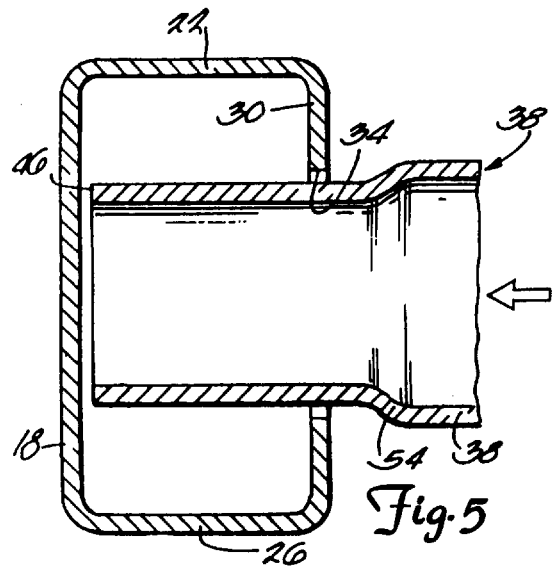
FIG. 5 is a cross sectional view of the support and the boxed side rail with the support being passed through an opening in the inboard wall of the side rail.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Referring now to the drawings, FIG. 1 illustrates a truck frame 10 embodying the invention. The frame 10 includes spaced apart left and right side rails. Each of the side rails is a boxed member 14 including (see FIGS. 2 and 3) an outboard wall 18, a top wall 22, a bottom wall 26 and an inboard wall 30 spaced from the outboard wall 18. The inboard wall 30 has an inboard opening 34 (FIG. 5) therein and, in one embodiment, the outboard wall 18 is solid.

Figure 6:
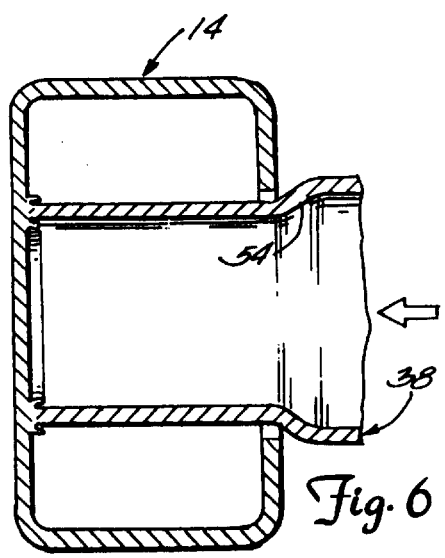
FIG. 6 is a cross sectional view of the support as the end of the support engages the outboard wall of the side rail.

The frame 10 further includes a cylindrical support 38 for attaching a device 42 (FIGS. 1 and 2) to the side rail. The cylindrical support 38 includes (see FIG. 3) a first end 46 and a second end 50. The cylindrical support 38 further includes a radially outwardly extending first shoulder 54 spaced from the first support end 46 at least the distance the boxed member 14 inboard wall 30 is spaced from the boxed member outboard wall 18, plus about the thickness of the outboard wall 18. The cylindrical support 38 is attached to the left side rail using the following method. The support 38 is spun by a conventional device similar to a drill (not shown), but with greater size and force, which can spin a rod or cylinder. The support 38 is spun at an appropriate speed. The support 38 is advanced using the same mechanism used for rotating the support 38 so that the support 38 passes through the inboard opening 34, as illustrated in FIG. 5. As the support 38 advances through the wall 30, the end 46 of the support 38 engages the outboard wall 18, as illustrated in FIG. 6. As the support 38 is advanced further, using an appropriate force, the spinning support 38 begins to friction weld to the outboard wall 18. The manner in which the support 38 is friction welded to the wall is more generally described in Thomas et al. U.S. Pat. Nos. 5,460,317 and 5,469,617 which are incorporated herein by reference. In other embodiments (not shown), the support can extend between the top and bottom side rail walls.

In the preferred embodiment, the support 38 and the boxed member 14 are made of SAE 1008 steel, although any low carbon or mild steel may be used. In other embodiments, the support 38 and the boxed member 14 can be made of aluminum. This has the benefit of no phase change in the weld zone (which is common in higher strength aluminum). In another embodiment, one of the support 38 and the boxed member 14 can be steel while the other is made of aluminum. A wide spectrum of materials, including for example high strength low alloy steels, high alloy steels, copper, brass, titanium, thermo-setting plastics, or combinations thereof, may be appropriate, depending on the application.

As the support 38 is further advanced through the opening in the inboard wall 30, the support 38 shoulder engages the inboard opening 34. As the support 38 is further spun and advanced through the opening, the shoulder 54 is also friction welded to the inboard wall 30. In this manner, as illustrated in FIG. 2, the method results in the support 38 being structurally friction welded to both the inboard wall 30 and the outboard wall 18 of the side rail.

Figure 9:
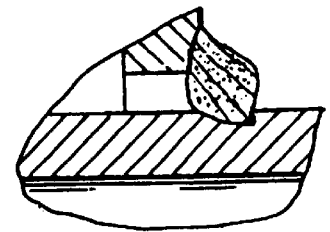
FIG. 9 is a cross sectional view of a prior art weld of a support to a boxed member.
Figure 10:
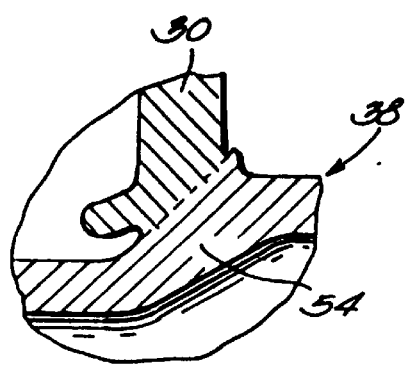
FIG. 10 is a cross sectional view of the friction weld of the invention.

In the preferred embodiment, the boxed section walls are internally supported and external flash produced by friction welding is removed. Removal of the flash results in a completed assembly which is more attractive than one with the flash in place. As illustrated in FIG. 10, the friction weld is much better than the conventional weld illustrated in FIG. 9.

The other or left side rail includes a support 38 attached to the side rail in a similar manner. A cross member 42 extends between the side rails and is attached to the side rails by the supports 38. In one embodiment, the cross member 42 is a hollow cylinder which is placed over one support 38, is then telescoped along the one support 38 so that the other end of the hollow cross member can be placed over the other support 38, and is then telescoped back so that the cross member extends over each of the supports 38. The cross member can then be attached to the supports, such as by friction riveting, bolting or welding.

Figure 7:
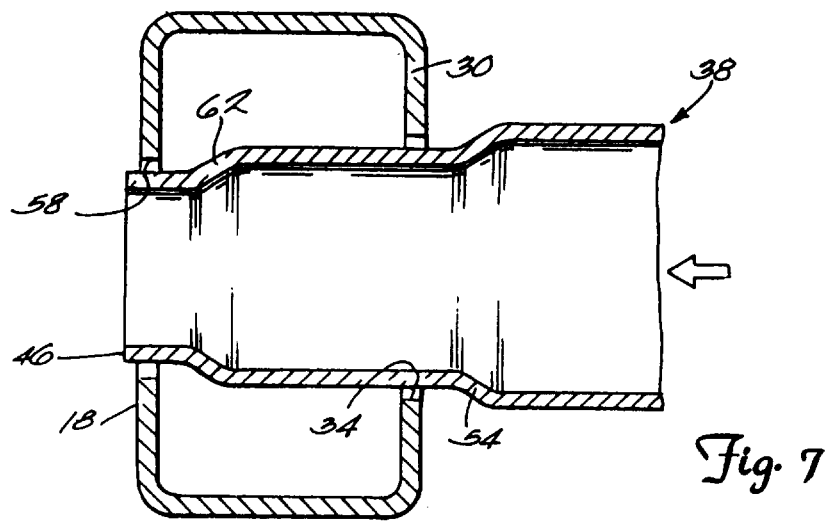
FIG. 7 is a cross sectional view of an alternate embodiment of the invention wherein the outboard wall also includes an opening therein and the support further includes a second shoulder.
Figure 8:
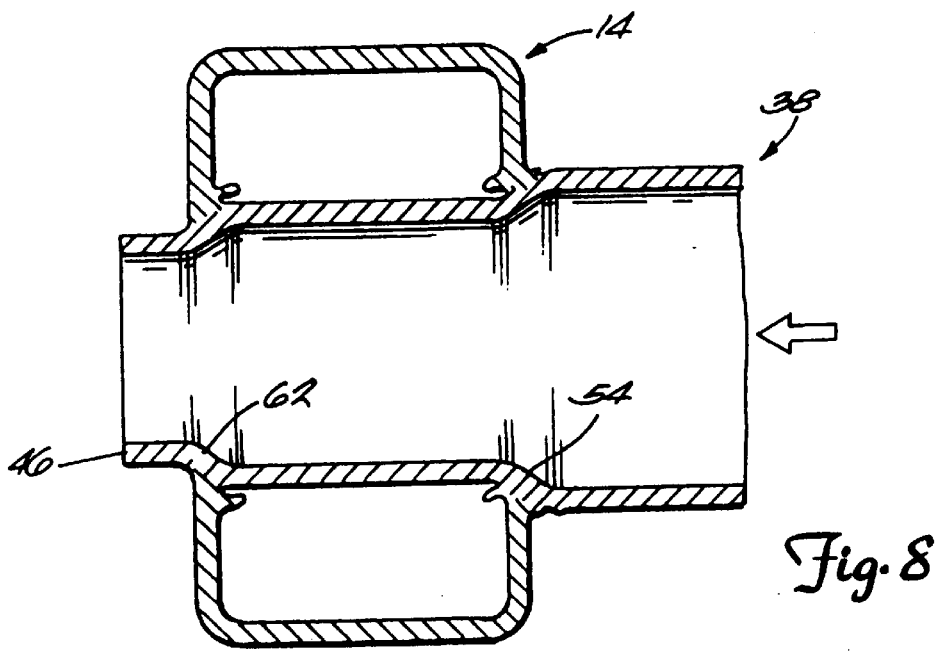
FIG. 8 is a cross sectional view of the support and boxed side rail of FIG. 7 illustrating the friction welding of the support to the boxed side rail.

In an alternate embodiment, as illustrated in FIGS. 7 and 8, the outboard wall 18 can include an outboard opening 58 which is opposite the inboard opening 34 and which is smaller in diameter than the inboard opening 34. The support 38 further includes an end shoulder 62 spaced a short distance from the end 46 of the support 38. In this embodiment, as the support 38 is spun and advanced through the inboard opening 34, the end of the support 38 also passes through the outboard wall opening 58. Eventually the support shoulder 54 engages the inboard wall 30 and the end shoulder 62 engages the outboard wall 18. As the support 38 continues to be advanced and spun, each of the shoulders is welded to its respective wall at about the same time.

Figure 11:
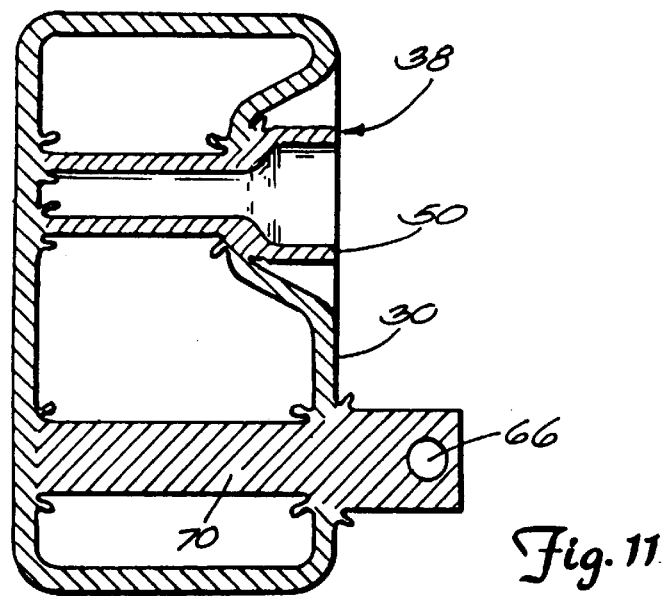
FIG. 11 is a cross sectional view of alternate support members welded to an alternate boxed side rail.
Figure 12:
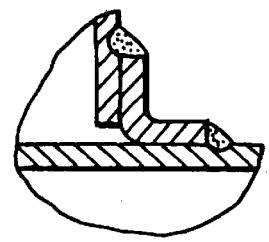
FIG. 12 is a cross sectional view of a prior art weld of a support to a boxed member.

In other embodiments, the supports 38 can be used to support other devices attached to the frame 10. In one embodiment, as illustrated in FIG. 4, the second end of the support 38 can be flattened using any conventional press. A hole 66 can then be drilled or pierced into the flattened end and used for attachment of various devices or structural cross members or bracketry. In other embodiments, as illustrated in FIG. 11, the inboard wall 30 can be indented toward the outboard wall 18, around the inboard opening 34, thereby permitting the second end 50 of the support 38, as illustrated in FIG. 11, to be generally flush with the majority of the inboard wall 30. This can be valuable where clearance is required of some further structure which must pass through the vehicle frame 10. In other embodiments, a solid support 70 can be used. The solid support 70 can also include the hole 66 for attachment purposes in the second end of the support 70.

Figure 13:
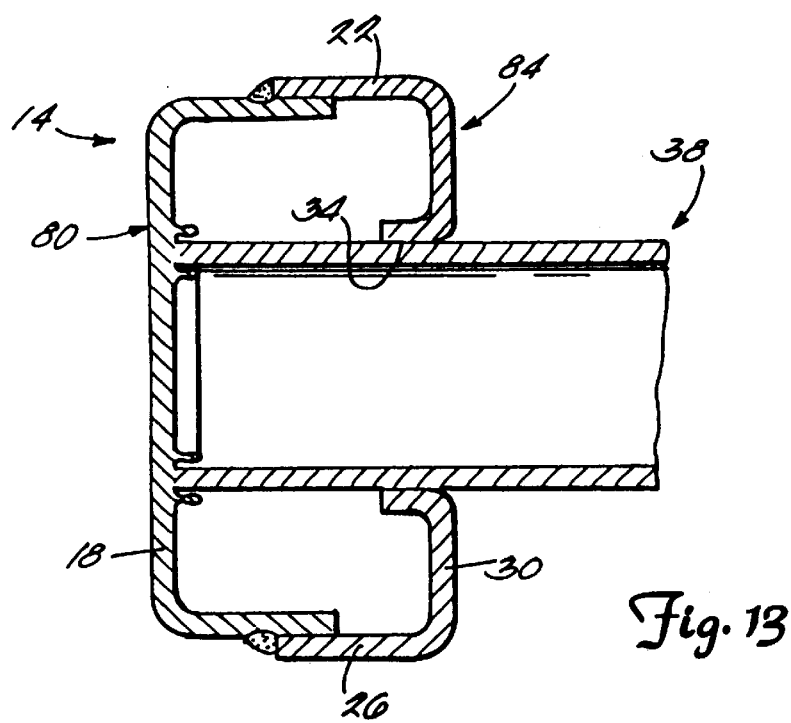
FIG. 13 is a cross sectional view of an alternate support member welded to an alternate boxed side rail.

Another alternative embodiment is shown in FIG. 13. Elements in common with the embodiment of FIGS. 2 and 3 have been given the same reference numerals. In this embodiment, each side rail 14 (only one is shown) is an assembly of two channels 80 and 84 welded together. The cross member 38 is a straight cylinder which is expanded to fit to the inboard wall hole 34 and friction welded to the outboard wall 18. The inboard wall hole 34 can be a raw hole or can be cupped or extruded for lead-in and strength. A conventional weld can be added or some friction weld may result (not shown). The end of the cross member can be chamfered (not shown) for lead-in. In this embodiment, the cross member is frictional welded directly to the side rails 14 by simultaneously pressing both side rails over the spinning cross member 38.

Various features of the invention are set forth in the following claims.

We claim:

1. A method of welding together a motor vehicle structural assembly including spaced apart left and right side rails, one of the side rails being a boxed member including an outboard wall, a top wall, an opposite bottom wall spaced from the top wall, and an opposite inboard wall spaced from the outboard wall, one of the walls having an opening therein, and a cylindrical support including a first end, the method comprising spinning the support and advancing the support through the one wall opening so that the support first end is friction welded to the wall opposite the one wall.

2. A method of welding together a motor vehicle structural assembly including spaced apart left and right side rails, one of the side rails being a boxed member including an outboard wall, a top wall, a bottom wall and an inboard wall spaced from the outboard wall, the inboard wall having an opening therein, and a cylindrical support including a first end, the method comprising spinning the support and advancing the support through the inboard wall opening so that the support first end is friction welded to the outboard wall.

3. The method of claim 2 wherein the outboard wall has an opening therein opposite the inboard opening, and wherein the support also passes through the outboard wall opening and the support has an end shoulder which engages and is friction welded to the outboard wall.

4. The method of claim 2 wherein the inboard wall is indented toward the outboard wall around the inboard wall opening, and wherein the support has a second end which is generally flush with the majority of the inboard wall.

5. The method of claim 2 wherein the support and the boxed member are made of steel.

6. The method of claim 2 wherein the support and the boxed member are made of aluminum.

7. The method of claim 2 wherein one of the support and the boxed member are made of steel and the other is made of aluminum.

8. The method of claim 2 wherein the support is a straight tube.

9. The method of claim 8 wherein the support is expanded to fit to the inboard wall.

10. The method of claim 8 wherein the support is friction welded to the inboard wall.

11. The method of claim 2 wherein the support includes a shoulder spaced from the first end at least the distance the boxed member inboard wall is spaced from the boxed member outboard wall, and wherein the support is advanced through the inboard wall opening so that the support shoulder is friction welded to the inboard wall.

12. The method of claim 11 wherein the support first end engages the outboard wall and then the support shoulder engages the inboard wall.

13. The method of claim 11 wherein the outboard wall has an opening therein opposite the inboard opening, and wherein the support also passes through the outboard wall opening and the support has an end shoulder which engages and is friction welded to the outboard wall.

14. The method of claim 2 wherein the support is a first support, and the other side rail is also a boxed member including an outboard wall, a top wall, a bottom wall and an inboard wall, the inboard wall having an opening therein, and wherein the structural assembly further includes a second cylindrical support including a first end, the method further comprising spinning the second support and advancing the second support through the other side rail inboard wall opening so that the second support first end is friction welded to the other side rail outboard wall.

15. The method of claim 14 wherein the second support includes a shoulder spaced from the first end of the second support, and wherein the second support is advanced through the other side rail inboard wall opening so that the support shoulder is friction welded to the inboard wall.

16. The method of claim 14 wherein the structural assembly further includes a cross member extending between the first support and the second support, the method further including the step of attaching the cross member to the first support and the second support.

17. The method of claim 2 wherein the support is a tube.

18. The method of claim 17 wherein the support further includes a second end, and wherein the method further includes the step of flattening the support second end.

19. The method of claim 18 wherein the method further includes the step of making a hole in the flattened support second end.

* * * * *